United States Patent [19]

Spencer et al.

[11] 4,341,483

[45] Jul. 27, 1982

[54] ADJUSTABLE CONNECTING APPARATUS

[75] Inventors: William R. Spencer, Springdale; Dana D. Freberg, Middletown, both of Ohio

[73] Assignee: General Electric Company, Cincinnati, Ohio

[21] Appl. No.: 209,363

[22] Filed: Nov. 24, 1980

[51] Int. Cl.[3] .......................... F16D 1/00; F16L 25/00

[52] U.S. Cl. ...................................... 403/4; 74/579 R; 416/168 R; 403/331; 403/103

[58] Field of Search ................. 416/168 R; 403/4, 71, 403/72, 103, 408, 331; 74/123, 124, 571 R, 571 L, 600 R, 579 R

[56] References Cited

U.S. PATENT DOCUMENTS

| | | | |
|---|---|---|---|
| 990,594 | 4/1911 | Roach | 74/522 |
| 2,168,072 | 8/1939 | Rumely | 403/4 X |
| 2,501,581 | 3/1950 | Rieger | 403/103 X |
| 3,138,960 | 12/1960 | Moo | 74/124 |
| 3,385,624 | 5/1968 | Baelini | 403/4 X |
| 3,449,966 | 6/1969 | Stevens | 74/579 X |
| 3,556,674 | 1/1971 | Foote | 416/168 R X |
| 3,577,801 | 5/1971 | Netta | 74/571 R |
| 3,583,734 | 6/1971 | Magi | 403/103 X |

FOREIGN PATENT DOCUMENTS

| | | | |
|---|---|---|---|
| 496094 | 12/1976 | Australia | 403/4 |

*Primary Examiner*—Wayne L. Shedd
*Attorney, Agent, or Firm*—Carl L. Silverman; Derek P. Lawrence

[57] ABSTRACT

The apparatus includes a first connecting link having a pair of axially opposing ends with one of the ends being coupled through a uniball to a drive portion of an actuator. A second connecting link includes a pair of axially opposing ends. One of the ends of the second connecting link is coupled to a driven portion, e.g., a butterfly valve. Coupling means, including a mating plug and socket, is provided for adjustably coupling the remaining opposing ends of the first and second links. The mating plug includes four sides and one hole disposed eccentrically therethrough and parallel to the sides. The remaining end of the second link includes a socket for mating with the plug. The plug can be mated in eight different rotational positions with respect to the socket. At each of the eight different rotational positions, the eccentric hole is disposed in a position which determines one of a predetermined number of available couplings between the first and second links. The remaining end of the first link includes an opening therethrough for receiving securing means. Securing means in the form of a bolt, including a uniball portion, passes through the eccentric hole and the opening in the first link for operationally securing the first and second links together in one of the predetermined number of couplings. Other embodiments are disclosed.

13 Claims, 7 Drawing Figures

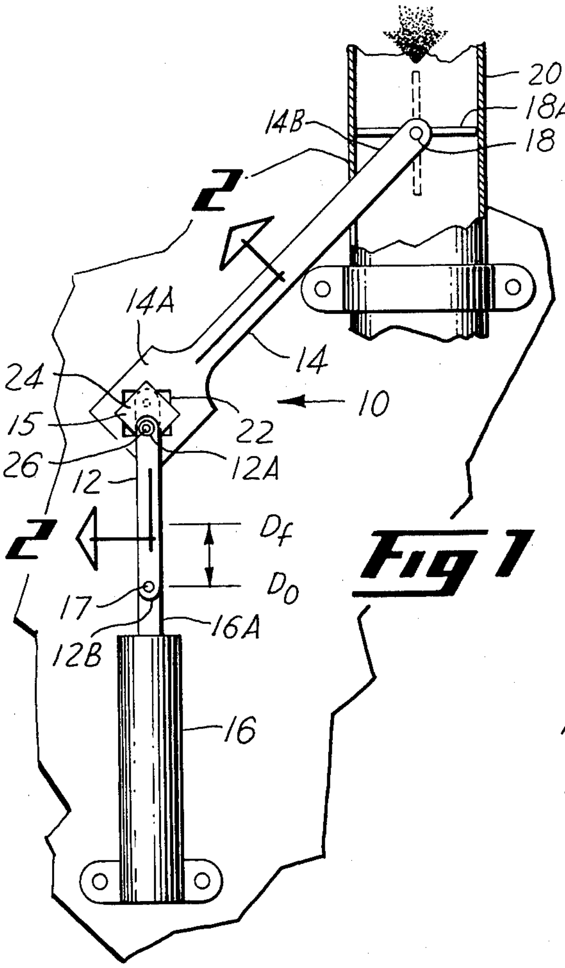
Fig 1
Fig 2
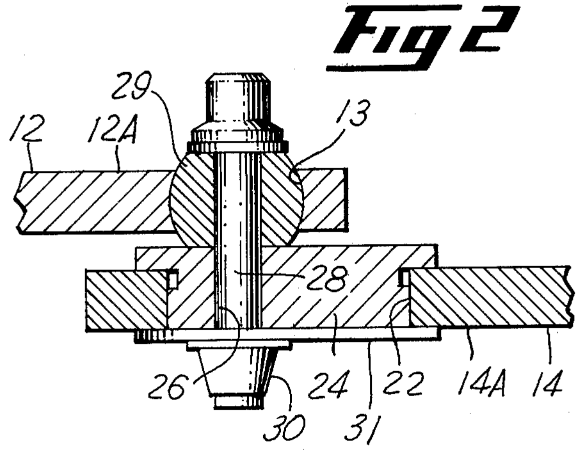
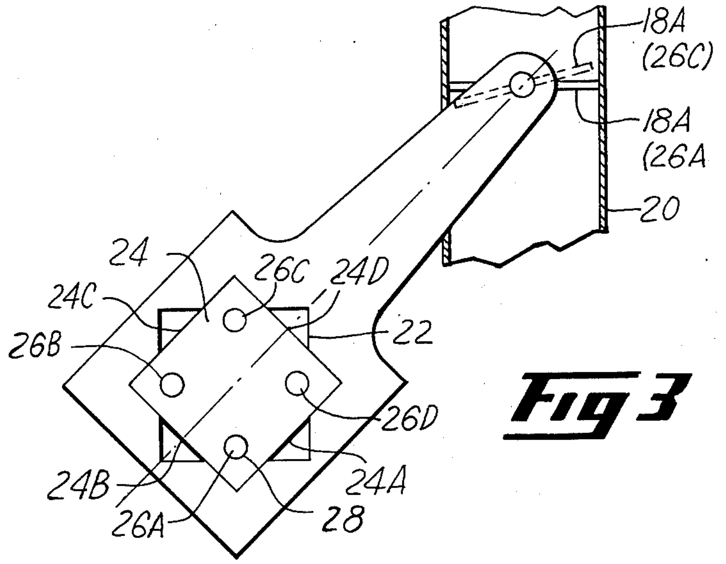
Fig 3

Fig 5
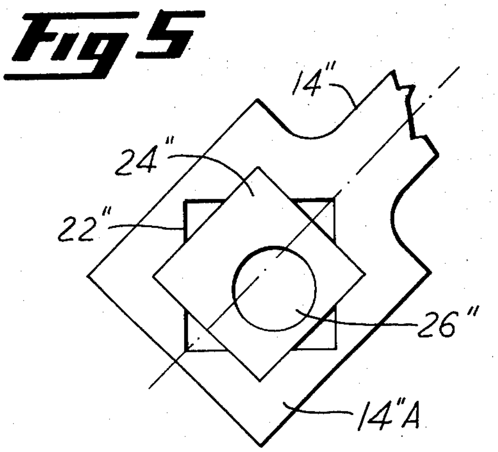
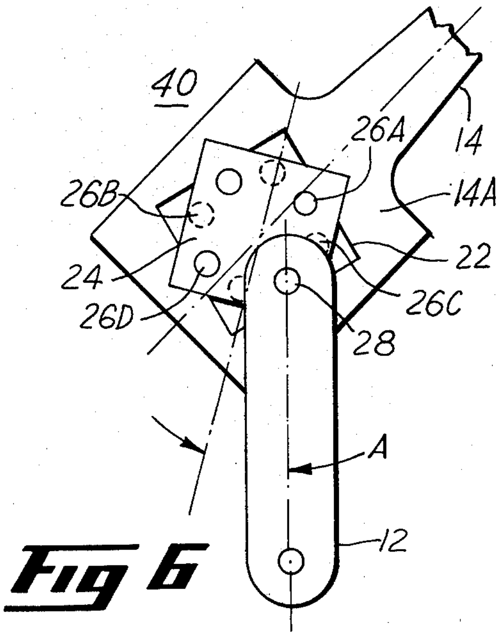
Fig 6
Fig 4
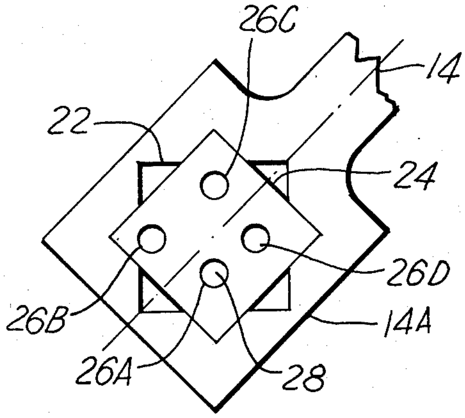
Fig 7
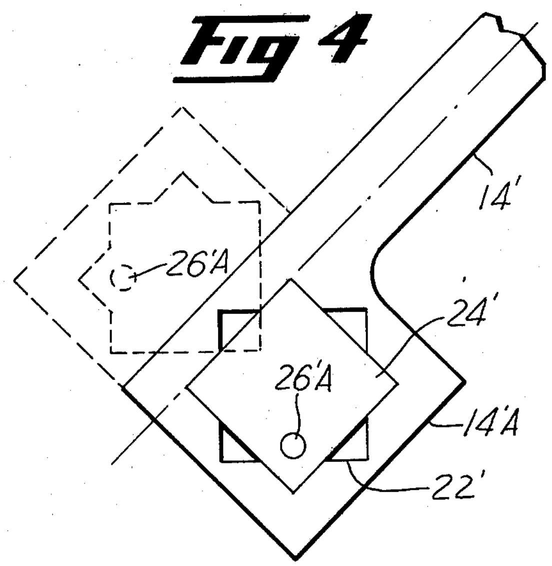

ADJUSTABLE CONNECTING APPARATUS

BACKGROUND OF THE INVENTION

The present invention relates to apparatus for adjustably connecting a driving member to a driven member, and more particularly, to such apparatus where the driving member and the driven member are located in close proximity to each other.

It is often necessary to adjustably couple a drive member to a driven member. For example, such adjustable coupling may be necessary in a gas turbine engine such as the one shown in U.S. Pat. No. 4,230,436, entitled, "Rotor/Shroud Clearance Control System," issued Oct. 28, 1980, to Samuel H. Davison. This patent is assigned to the assignee of the present invention and is hereby incorporated by reference in the present application.

Such an exemplary gas turbine engine typically includes a number of operating components such as a fan section, a compressor section, a combustor section, a high pressure turbine section, a low pressure turbine section, and an exhaust section. The engine also includes a plurality of actuators for driving mechanisms such as air valves, fuel valves, and other mechanism valves for effecting desirable engine operation. In the assembly of such an engine, the actuators and the valves to be actuated are generally placed in relatively fixed positions and in spaced relation to each other. The actuator typically includes a drive portion for driving a driven member on the device to be actuated. Manufacturing tolerances and space limitations may require that the drive member be coupled to the driven member through adjustable connecting apparatus.

Conventional adjustable connecting apparatus are not fully satisfactory for all such coupling situations. Indeed, conventional adjustable connecting apparatus typically require considerable space and are generally difficult to use where space is limited. Also, conventional adjustable connecting apparatus have a tendency to move out of adjustment.

Accordingly, it is a general object of this invention to provide improved adjustable connecting apparatus for connecting a drive member to a driven member.

It is another object of this invention to provide such apparatus which is simple to use.

It is another object of this invention to provide such apparatus which includes a locking feature for retaining a particular adjustment.

It is another object of this invention to provide such apparatus which provides a predetermined plurality of adjustments.

SUMMARY OF THE INVENTION

In one form of our invention, we provide an adjustable connecting apparatus for connecting a movable drive portion of a first relatively fixed position first operating member to a movable driven portion of a relatively fixed position second member which is spaced from the first member. The apparatus includes a first connecting link having a pair of axially opposing ends with one of the ends adapted to be coupled to the drive portion. A second connecting link is provided and includes a pair of axially opposing ends with one of the ends adapted to be coupled to the driven portion. Coupling means is provided for adjustably coupling the remaining opposing ends of the first and second connecting links. The coupling means includes a mating plug having at least three sides and having at least one hole disposed eccentrically therethrough and generally parallel to the sides. One of the remaining opposing ends of the two links includes a socket therein for lockingly mating with the plug wherein the eccentric hole can be disposed in a plurality of different rotational positions with respect to the socket. The remaining opposing end of the other connecting link includes an opening therethrough for receiving securing means therethrough. Securing means is provided for passing through the eccentric hole and the opening in the remaining opposing end of the other connecting link for operationally securing the first and second connecting links together with the eccentric hole being in one of the plurality of different rotational positions.

BRIEF DESCRIPTION OF THE DRAWINGS

For a better understanding of the invention, reference may be had to the following description, taken in conjunction with the accompanying drawings, wherein:

FIG. 1 is a schematic representation of one form of the adjustable connecting apparatus of the present invention depicting one application thereof.

FIG. 2 is a sectional view, taken along line 2—2 of FIG. 1.

FIG. 3 is a diagrammatic representation of a portion of the connecting apparatus shown in FIG. 1 showing the manner in which the apparatus can be adjusted.

FIGS. 4–7 are schematic representations respectively showing portions of other forms of the adjustable connecting apparatus of the present invention.

DETAILED DESCRIPTION OF THE INVENTION

Referring initially to FIGS. 1 and 2, an exemplary application of one form of adjustable connecting apparatus 10 of the present invention is shown. The adjustable connecting apparatus 10 includes a first connecting link 12 having a pair of axially opposing ends 12A and 12B and a second connecting link 14 having a pair of axially opposing ends 14A and 14B. As will be discussed later, opposing ends 12A and 14A of the links 12, 14, respectively, are adjustably connected through coupling means 15.

In the exemplary application shown in FIG. 1, the adjustable connecting apparatus 10 adjustably connects a relatively fixed position drive member 16 to a relatively fixed position driven member 18. The drive member 16 may comprise a conventional actuator 16 which includes a linearly movable drive portion 16A. The drive portion 16A may be a conventional drive member of the type which is controlled to linearly translate between positions $D_o$ and $D_f$. The drive portion 16A is coupled to the end 12B of the connecting link 12 through a conventional uniball 17. The driven member 18 may comprise a valve 18 which includes a rotationally driven butterfly valve 18A located in a conduit 20. In FIG. 1, as the drive portion 16A controllably moves linearly from $D_o$ to $D_f$, the valve 18A rotates from a first predetermined position, e.g., closed, to a second predetermined position, e.g., open, as shown in dashed lines. For some applications, the first predetermined valve position may be an open position.

The coupling means 15 includes at least one eccentrically located hole for adjustably locating the connection between ends 12A and 14A of connecting links 12 and 14, respectively. More particularly, referring now to FIGS. 1–3, end 14A is provided with a socket 22 extending therethrough. For illustration purposes, in FIGS. 1–3, an exemplary eight-point socket 22 is shown centrally located in end 14A. A mating plug 24 is also provided for mating with the socket 22. For example, as shown in FIGS. 1–3, the mating plug 24 may be square shaped with four generally parallel sides 24A, 24B, 24C, 24D. The mating plug 24 includes at least one eccentric hole 26 extending therethrough and generally parallel to the sides 24A–D. As can be best seen in FIG. 2, securing means 28, such as a bolt, passes through the eccentric hole 26 and through an opening 13 in the end 12A of connecting link 12. The securing means 28 may include a uniball portion 29 for mating with the opening 13 in the link 12. In one form, the securing means 28 includes fastener means 30, such as a nut, and retaining means 31, such as a washer.

Referring now to FIGS. 1 and 3, the operation of one form of the adjustable connecting apparatus 10 of the present invention will now be described. In one application, where, for example, valve 18A controls the passage of cooling air (shown as an arrow) to an engine part, it may be desirable that the valve 18A be fully closed when the drive portion 16A is at position $D_o$. The coupling means 15, through the position of the eccentric hole 26, provides a number of adjustable positions for ensuring that, whatever the relatively fixed positions of the actuator 16 and valve 18, the valve 18A is at the desired closed position when the drive portion 16A is at position $D_o$. More particularly, as shown in FIG. 3, the securing means 28, when located at the eccentric hole position 26A, results in a particular corresponding position of the valve 18A. Note, however, that the eccentric hole positions 26B, 26C, and 26D each result in a different corresponding position of the valve 18A. In this connection, with securing means 28 located at eccentric hole position 26C, valve 18A is at a different position for the same position of the drive portion 16A. Although four such eccentric hole positions (26A–26D) are shown in FIG. 3, it is to be appreciated that rotation of the plug 24 within the socket 22 will actually result in eight different rotational positions of the eccentric hole. Thus, the use of the four-sided plug 24 in an eight-pointed socket 22 results in eight available adjustments to the valve 18A.

Referring now to FIG. 4, a portion of another form of the connecting apparatus of the present invention is designated 14′. Member 14′ is similar to connecting link 14 of FIGS. 1–3. However, in member 14′, the end 14′A includes a socket 22′ which is offset. The offset socket 22′ provides a desirable adjustment range. More particularly, the socket 22′ is offset from the longitudinal axis of the member 14′. Thus, as compared to the connecting link 14 of FIGS. 1–3, eight additional adjustments are provided simply by reversing the member 14′, as shown in dashed lines.

In the present invention, the mating provided between the mating plug and the socket is highly desirable in that the particular adjustment chosen is substantially locked into place. In addition, the adjustable connecting apparatus of the present invention is particularly well suited for applications where space limitations do not allow linearly adjustable connecting links. Also, the connecting apparatus of the present invention is relatively simple to use.

Although the invention has been described in connection with an exemplary four-sided mating plug and an eight-pointed socket, it is to be appreciated that the number of mating plug sides and socket points may be increased or decreased depending upon the particular application involved. Indeed, the mating plug may have as few as three sides and the socket may also have as few as three points. Such a three-sided plug and three-pointed socket would provide only three adjustable positions. Similarly, for finer adjustments, other plug-socket combinations may be provided. For example, a mating plug having four sides can be mated with a socket having 12 points, thus providing 12 different adjustable positions.

Further, although the invention has been described in connection with a linearly movable drive member and a rotatably movable driven member, other forms of motion are available. For example, such available drive-driven forms include: linear-linear; rotatably-linear; rotatably-rotatably, and other typical forms of motion encountered between drive and driven portions.

It is also to be recognized that the coupling means of the present invention need not be located in the end of the connecting link which is coupled to the driven member, as previously illustrated. Indeed, if desired, the coupling means, i.e., the mating plug and socket, may be located in the end of the link which is coupled to the driving member. Further, as noted previously, the mating plug may include one or a plurality of eccentric holes located therein. However, where space is limited, a single eccentric hole is desirable. For example, FIG. 5 shows a connecting link 14″ having an end 14″A. The end 14″A includes a socket 22″ into which a mating plug 24″ is mateably inserted. The mating plug 24″ includes a single eccentric hole 26″ located therein. Of course, if only one such eccentric hole 26″ is provided, it is necessary that the mating plug 24″ be mateable with the socket 22″ in a number of rotational positions.

For some applications of the adjustable connecting apparatus of the present invention, it is desirable to reduce the likelihood of redundant adjustment positions. For such applications, the form of the present invention shown in FIG. 6 is desirable. The apparatus 40 of FIG. 6 is similar to the apparatus of FIGS. 1–3, so that wherever possible, like reference numerals have been employed to represent like elements. In the apparatus 40, however, the socket 22 is rotationally indexed at a predetermined indexing angle A from the expected, or reference, position of the connecting link 12. An indexing angle A may be determined by the following expression: $2 \sin A = \sin (A + 360/N) - \sin A$, where A is the indexing angle and N is the number of points on the socket. With this expression, three substantially equal mid-range adjustments are available moving from hole positions 26A to 26B, 26B to 26C, and 26C to 26D. For an exemplary eight-point socket, indexing angle A is 10.8 degrees if this expression is employed. Of course, other indexing angles and expressions may be employed.

Further referring again to FIG. 3, if desired, eccentric hole positions 26A, 26B, 26C, and 26D may be provided with different eccentricities as shown in FIG. 7 so as to provide relatively large adjustments through the location of the securing means 28 and smaller adjustments being provided by rotation of the plug 24 in the socket 22.

While the present invention has been described with reference to specific embodiments thereof, it will be obvious to those skilled in the art that various changes and modifications may be made without departing from the invention in its broader aspects. It is contemplated in the appended claims to cover all variations and modifications of the invention which come within the true spirit and scope of our invention.

What is claimed as new and desired to be secured by Letters Patent of the United States:

1. Adjustable connecting apparatus for connecting a movable drive portion of a first relatively fixed position first operting member to a movable driven portion of a relatively fixed position second member which is spaced from the first member, which comprises:

(a) a first connecting link having a pair of axially opposing ends, one of said ends adapted to be coupled to the drive portion;

(b) a second connecting link having a pair of axially opposing ends, one of said ends adapted to be coupled to the driven portion;

(c) coupling means for adjustably coupling said remaining opposing ends of said first and second connecting links, which includes:

(i) a mating plug having at least three sides and having at least one hole disposed eccentrically therethrough and generally parallel to said sides;

(ii) said remaining opposing end of one of said connecting links including a socket therein for lockingly mating with said plug wherein said eccentric hole can be disposed in a plurality of different rotational positions with respect to said socket;

(iii) said remaining opposing end of the other of said connecting links includes an opening therethrough for receiving securing means; and (iv) securing means for passing through said eccentric hole and said opening in said remaining opposing end of the other of said connecting links for operationally securing said first and second connecting links together with said eccentric hole being in one of said plurality of different rotational positions.

2. Adjustable connecting apparatus in accordance with claim 1 in which said mating plug includes at least four sides and in which said socket includes at least eight points wherein said plug can be mated in at least eight different rotational positions with respect to said socket.

3. Adjustable connecting apparatus in accordance with claim 2 in which said socket is offset with respect to said one connecting link.

4. Adjustable connecting apparatus in accordance with claim 2 in which said socket is rotationally indexed with respect to a reference position of said other connecting link for reducing redundant rotational positions of said eccentric hole in said socket.

5. Adjustable connecting apparatus in accordance with claim 4 in which said second connecting link comprises said one connecting link and said first connecting link comprises said other connecting link.

6. Adjustable connecting apparatus in accordance with claim 2 in which said socket is offset with respect to said one connecting link.

7. Adjustable connecting apparatus in accordance with claim 6 in which said securing means comprises uniball means.

8. Adjustable connecting apparatus in accordance with claim 7 in which said first operating member comprises an actuator which controllably linearly translates from a first position to a second position and said second member comprises a valve wherein at least one of said plurality of different rotational positions provides a predetermined valve position when said actuator is in said first position.

9. Adjustable connecting apparatus in accordance with claim 8 in which said predetermined valve position comprises a substantially closed position.

10. Adjustable connecting apparatus in accordance with claim 8 in which said predetermined valve position comprises a substantially open position.

11. Adjustable connecting apparatus in accordance with claim 1 in which said movable drive portion is linearly movable and said movable driven portion is rotatably movable.

12. Adjustable connecting apparatus in accordance with claim 1 in which said mating plug includes only one of said eccentric holes.

13. Adjustable connecting apparatus in accordance with claim 12 in which said mating plug includes a plurality of said eccentric holes with at least two of said eccentric holes being of different eccentricity.

* * * * *